(12) United States Patent
Montani et al.

(10) Patent No.: US 11,242,917 B2
(45) Date of Patent: Feb. 8, 2022

(54) TENSIONER FOR AN ACCESSORY DRIVE OF A MOTOR VEHICLE

(71) Applicant: DAYCO EUROPE S.R.L., Chieti (IT)

(72) Inventors: Andrea Montani, Chieti (IT);
Gianluca Cariccia, Chieti (IT);
Emanuele Angelucci, Chieti (IT);
Sabrina Bertaggia, Chieti (IT);
Claudio Ubertis Albano, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 224 days.

(21) Appl. No.: 16/614,013

(22) PCT Filed: May 17, 2018

(86) PCT No.: PCT/IB2018/053480
§ 371 (c)(1),
(2) Date: Nov. 15, 2019

(87) PCT Pub. No.: WO2018/211452
PCT Pub. Date: Nov. 22, 2018

(65) Prior Publication Data
US 2020/0072323 A1    Mar. 5, 2020

(30) Foreign Application Priority Data

May 17, 2017 (IT) .......................... 102017000053588

(51) Int. Cl.
*F16H 7/12*    (2006.01)
*F16H 7/08*    (2006.01)

(52) U.S. Cl.
CPC .......... *F16H 7/12* (2013.01); *F16H 2007/081* (2013.01); *F16H 2007/0865* (2013.01);
(Continued)

(58) Field of Classification Search
CPC .......... F16H 2007/0874; F16H 7/1281; F16H 2007/081; F16H 2007/0846; F16H 2007/0891; F16H 7/1263
(Continued)

(56) References Cited

U.S. PATENT DOCUMENTS 4,019,397 A * 4/1977 Bochan .................. D06F 58/08
474/109
4,564,098 A * 1/1986 Hormann .............. E05F 15/668
192/150
(Continued)

OTHER PUBLICATIONS

PCT, International Search Report and Written Opinion; Application No. PCT/IB2018/053480 (12 Pages).

*Primary Examiner* — Henry Y Liu
(74) *Attorney, Agent, or Firm* — FisherBroyles, LLP; Susan M. Oiler (57) ABSTRACT

Tensioner for an accessory drive of a motor vehicle each have a support element adapted to be fixed on an electric machine, an intermediate element carried by the support element and rotating with respect thereto about a first fixed axis, a rigid tensioner element rotating with respect to the intermediate element about a second axis parallel to the first axis, a pair of tensioner pulleys carried by the tensioner element and adapted to cooperate with respective branches of an endless drive element of the drive positioned on opposite sides with respect to the electric machine, and a spring acting between the support element and the intermediate element to push the tensioner pulleys into contact with the endless drive element.

15 Claims, 13 Drawing Sheets

(52) U.S. Cl.
CPC ................ *F16H 2007/0874* (2013.01); *F16H 2007/0893* (2013.01)

(58) Field of Classification Search
USPC ................................................ 474/134, 137
See application file for complete search history.

(56) References Cited

U.S. PATENT DOCUMENTS

| | | | | |
|---|---|---|---|---|
| 6,511,393 | B1* | 1/2003 | Bogl | F01L 1/024 |
| | | | | 474/101 |
| 6,648,783 | B1* | 11/2003 | Bogner | F16H 7/1281 |
| | | | | 474/134 |
| 7,494,434 | B2* | 2/2009 | Mc Vicar | F16H 7/1281 |
| | | | | 474/101 |
| 7,896,765 | B2* | 3/2011 | Kuo | F16H 7/1281 |
| | | | | 474/134 |
| 8,439,780 | B2* | 5/2013 | Ruffini | F16H 7/1281 |
| | | | | 474/112 |
| 8,821,328 | B2* | 9/2014 | Jud | F16H 7/1281 |
| | | | | 474/134 |
| 2002/0086751 | A1* | 7/2002 | Bogner | F02B 67/06 |
| | | | | 474/134 |
| 2003/0109342 | A1* | 6/2003 | Oliver | F02B 67/06 |
| | | | | 474/134 |
| 2003/0176249 | A1* | 9/2003 | Polster | F16H 7/1209 |
| | | | | 474/134 |
| 2003/0216203 | A1* | 11/2003 | Oliver | F16H 7/1281 |
| | | | | 474/134 |
| 2003/0220164 | A1* | 11/2003 | Tamai | F16H 7/1281 |
| | | | | 474/134 |
| 2004/0043854 | A1* | 3/2004 | Fraley, Jr. | F16H 7/1281 |
| | | | | 474/134 |
| 2004/0072642 | A1* | 4/2004 | Serkh | F16H 7/1218 |
| | | | | 474/134 |
| 2004/0077446 | A1* | 4/2004 | Manning | F16H 7/1281 |
| | | | | 474/134 |
| 2005/0181901 | A1* | 8/2005 | Shin | F16H 7/1218 |
| | | | | 474/134 |
| 2006/0217222 | A1* | 9/2006 | Lolli | F16H 7/1281 |
| | | | | 474/134 |
| 2006/0287146 | A1* | 12/2006 | McVicar | F16H 7/1281 |
| | | | | 474/109 |
| 2007/0037648 | A1* | 2/2007 | Di Giacomo | F02B 67/06 |
| | | | | 474/134 |
| 2008/0214342 | A1* | 9/2008 | Montani | F02B 67/06 |
| | | | | 474/134 |
| 2009/0298631 | A1* | 12/2009 | Jud | F02B 67/06 |
| | | | | 474/237 |
| 2010/0255944 | A1* | 10/2010 | Grobbel | F16H 7/06 |
| | | | | 474/136 |
| 2011/0070985 | A1* | 3/2011 | Deneszczuk | F16H 7/14 |
| | | | | 474/135 |
| 2011/0281676 | A1* | 11/2011 | Trappolini | F16H 7/1281 |
| | | | | 474/134 |
| 2013/0040770 | A1* | 2/2013 | Wolf | F16H 7/1281 |
| | | | | 474/134 |
| 2013/0095967 | A1* | 4/2013 | Wolf | F16H 7/1281 |
| | | | | 474/135 |
| 2013/0203535 | A1* | 8/2013 | Mack | F16H 7/129 |
| | | | | 474/134 |
| 2013/0260932 | A1* | 10/2013 | Adam | F16H 7/1218 |
| | | | | 474/134 |
| 2014/0256488 | A1* | 9/2014 | Wolf | F16H 7/12 |
| | | | | 474/135 |
| 2014/0342862 | A1* | 11/2014 | Wolf | F16H 7/1218 |
| | | | | 474/117 |
| 2015/0219189 | A1* | 8/2015 | Serkh | F16H 7/1281 |
| | | | | 474/112 |
| 2015/0300462 | A1* | 10/2015 | Serkh | F16H 7/1281 |
| | | | | 474/112 |
| 2015/0345597 | A1* | 12/2015 | Walter | F16H 7/1218 |
| | | | | 474/134 |
| 2015/0369347 | A1* | 12/2015 | Wolf | F16H 7/1281 |
| | | | | 474/134 |
| 2017/0037940 | A1* | 2/2017 | Serkh | F16H 7/1281 |
| 2017/0082176 | A1* | 3/2017 | Buchen | F16H 7/1281 |
| 2018/0019638 | A1* | 1/2018 | Ben-Omrane | H02K 9/06 |
| 2018/0172117 | A1* | 6/2018 | Arneth | F16H 7/08 |
| 2018/0320765 | A1* | 11/2018 | Hauck | F16H 7/1218 |
| 2019/0078667 | A1* | 3/2019 | Liu | F16H 7/10 |
| 2019/0120344 | A1* | 4/2019 | Kim | F16H 7/1263 |
| 2019/0145501 | A1* | 5/2019 | Singh | F16H 7/1281 |
| | | | | 474/134 |
| 2021/0018074 | A1* | 1/2021 | Pfeifer | F16H 7/1281 |

* cited by examiner

TENSIONER FOR AN ACCESSORY DRIVE OF A MOTOR VEHICLE

CROSS-REFERENCE TO RELATED APPLICATIONS

The present invention is filed under 35 U.S.C. § 371 as the U.S. National Phase of International Patent Application No. PCT/IB2018/053480, filed May 17, 2018, which designated the United States and which claims the benefit of Italian Patent Application No. 102017000053588, filed on 17 May 2017, the disclosure of which is incorporated by reference.

TECHNICAL FIELD

The present invention relates to a tensioner for an accessory drive of a motor vehicle.

BACKGROUND ART

In motor vehicles, a reversible electric machine is increasingly frequently used in place of the conventional alternator; said electric machine can operate as a generator but also as an electric motor at start-up or as a booster motor.

The accessory drive generally comprises a pulley connected to the drive shaft and a pulley connected to the rotor of the electric machine, and can comprise one or more pulleys for driving other accessories, for example the conditioning system compressor. The accessory drive further comprises a belt for transmission of the movement between the above-mentioned pulleys and a tensioner adapted to ensure a correct minimum tension level of the belt and avoid slipping between the same and the pulleys.

In conventional accessory drives, in which the electric machine is an alternator driven by the motor, the tensioner acts on the slack branch of the belt, i.e. the branch positioned downstream of the motor and upstream of the alternator with reference to the direction of movement of the belt.

The use of a reversible electric machine means that the branch of the belt which is tensioned in the operating conditions in which the electric machine is driven by the motor becomes the slack branch when the torque is delivered by the electric machine.

Various solutions that enable both branches of the belt to be tensioned have therefore been developed.

One solution consists, for example, in using a tensioner with two arms hinged in a shared pin and bearing respective pulleys. The arms are subject to the elastic force of a spring which tends to move them close to each other so as to keep the pulleys in contact with respective branches of the belt. An example of this solution is described for example in EP 1581753-A. The shared axis of the two arms can be inside or outside the path of the belt.

Another solution consists in mounting the tensioner on the electric machine. According to this solution, the tensioner comprises an annular element rotating about the axis of the electric machine and bearing a pulley, and an arm articulated or sliding in respect to the annular element and bearing the other pulley; a spring is interposed between the annular element and the arm so as to push the pulleys into contact with the belt.

The known solutions are not optimized in terms of reactivity to sudden tension changes in the belt, in particular in the transition steps between the different operating modes of the electric machine.

DISCLOSURE OF INVENTION

One object of the invention is to solve the above-mentioned problem. A further object of the present invention is to ensure compensation of the belts elongation over time, without loss of reactivity.

The above-mentioned object is achieved by a tensioner having a support element, an intermediate element carried by the support element and rotating with respect thereto about a first fixed axis, a rigid tensioner element rotating with respect to the intermediate element about a second axis parallel to the first axis, a first tensioning pulley and a second tensioning pulley carried by the tensioner element and each rotating with respect thereto about respective axes distinct from said first and second axis, and a spring acting between the support element and the intermediate element to push the first and second tensioning pulleys in to contact with separate branches of an endless drive element positioned on opposite sides with respect to the second tensioning pulley. The first and second tensioning pulleys are arranged in a fixed relative position during operation of a drive system.

BRIEF DESCRIPTION OF THE DRAWINGS

For a better understanding of the present invention three embodiments are described, by way of non-limiting example and with reference to the attached drawings, in which.

BEST MODE FOR CARRYING OUT THE INVENTION

Figures 1, 2, 3, 4:
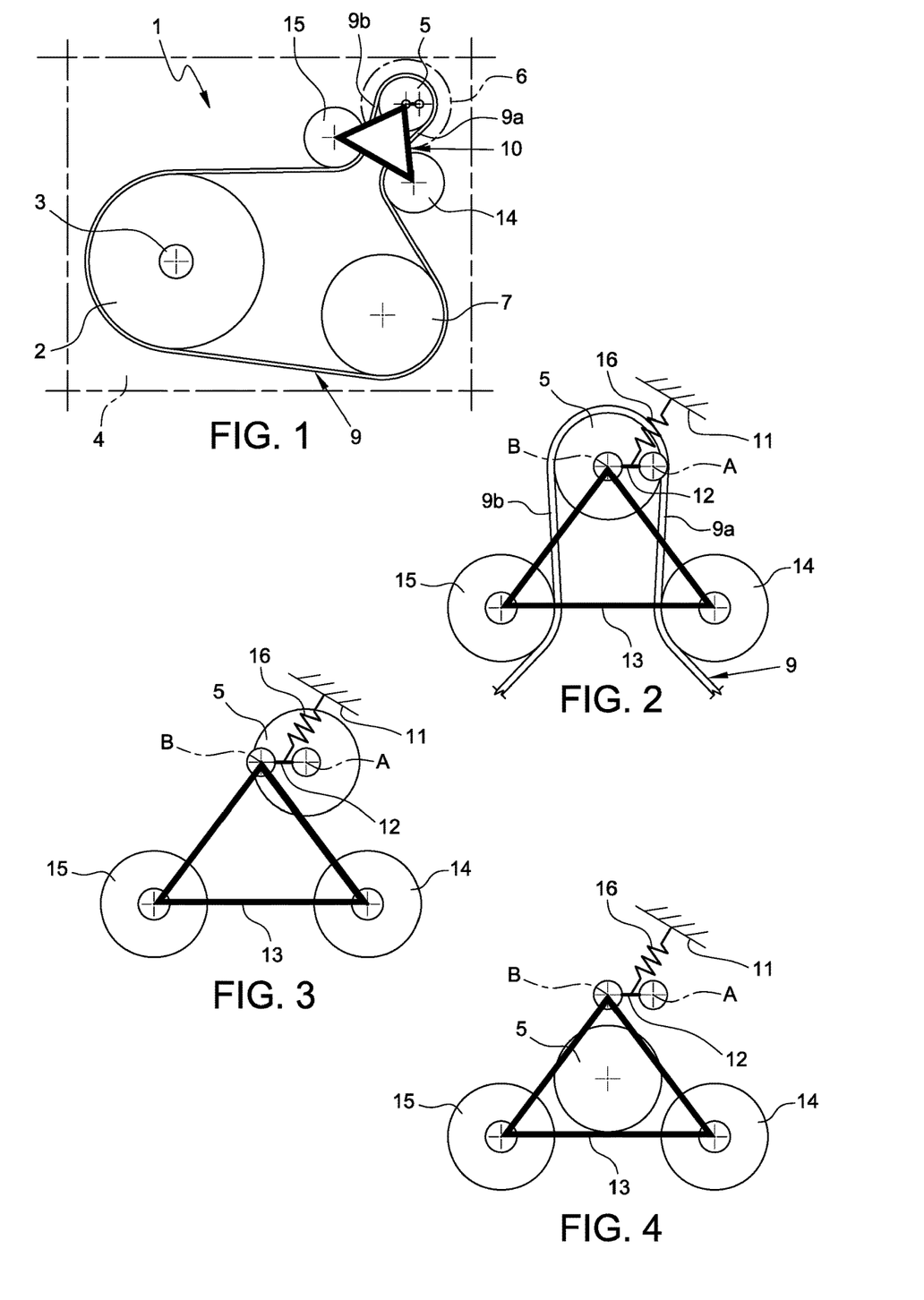
FIG. 1 is a schematic view of an accessory drive for a vehicle comprising a tensioner according to the present invention.
FIGS. 2, 3 and 4 are functional diagrams of three embodiments of the present invention.
Figure 5:
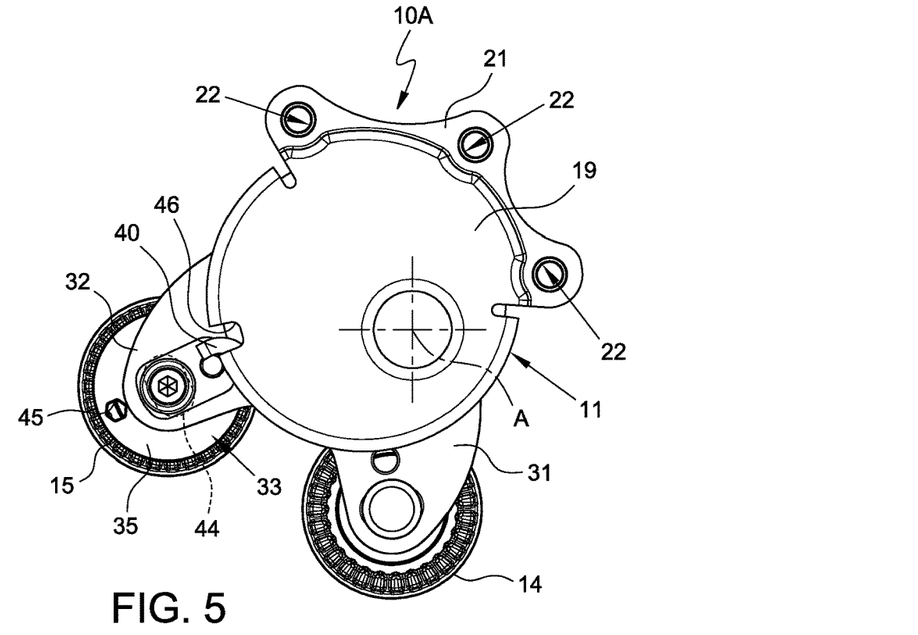
FIG. 5 is a front elevation view of a tensioner according to the first embodiment of the invention.
Figure 6:
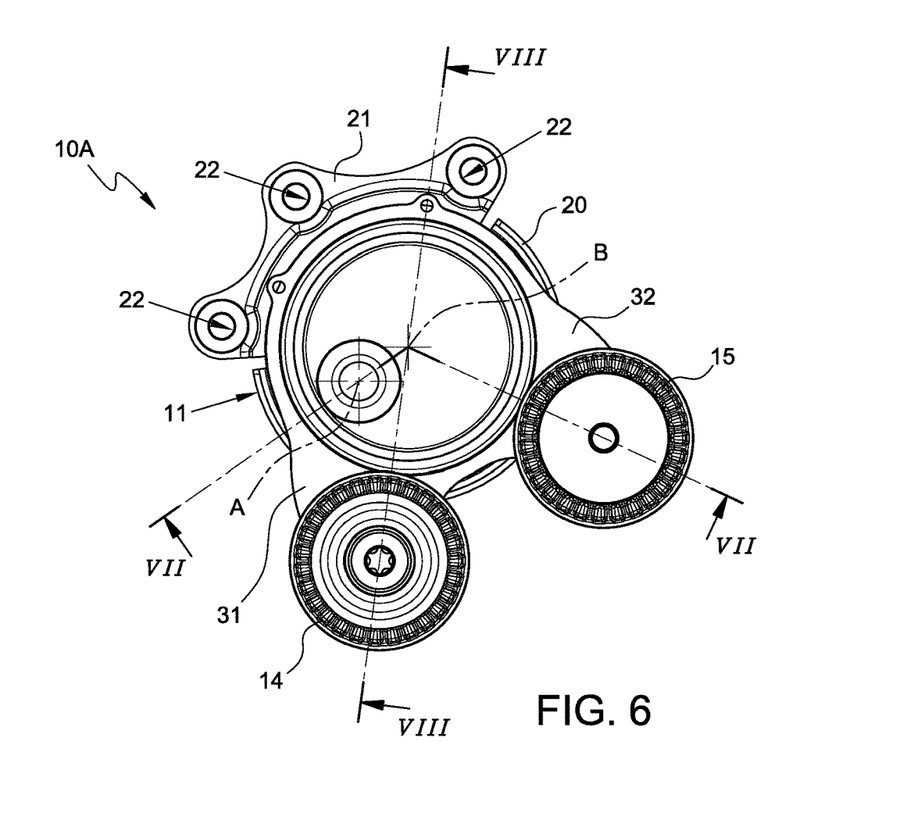
FIG. 6 is a rear elevation view of the tensioner of FIG. 5.

With reference to FIG. 1, an accessory drive for a motor vehicle is indicated overall by 1.

The drive 1 comprises a first pulley 2 rotationally coupled to a drive shaft 3 of an internal combustion engine 4 of the vehicle, a second pulley 5 rotationally coupled to a rotor of a reversible electric machine 6 and a third pulley 7 for driving a compressor (not illustrated) of a conditioning system of the vehicle.

The transmission 1 further comprises an endless drive element 9, preferably a poly-V belt, which cooperates with the first, second and third pulley 2, 5, 7 for driving the movement between these latter.

The drive 1 lastly comprises a tensioner 10 mounted on (or close to) the electric machine 6 and comprising (FIGS. 2-4):

a support element 11 adapted to be fixed on or close to the electric machine, inside or outside the path of the belt, an intermediate element 12 carried by the support element 11 and rotating with respect thereto about a first fixed axis A;

a rigid tensioner element 13, carried by the intermediate element 12 and rotating with respect thereto about a second axis B parallel to the first axis A and distinct from it, the axis B therefore being mobile due to the rotation movement of the intermediate element 12 with respect to the support element 11 about the axis A;

a first tensioner pulley 14 and a second tensioner pulley 15 carried by the tensioner element 13 and rotating with respect thereto about respective axes distinct from said first and second axis; the tensioner pulleys 14 and 15 cooperate with the back of respective branches 9a, 9b of the belt 9 arranged immediately upstream and downstream of the second pulley 5 (FIG. 1);

a spring 16 acting between the base element 11 and the intermediate element 12 to push the tensioning pulleys 14, 15 into contact with the belt 9.

FIGS. 2, 3 and 4 schematically illustrate three embodiments that differ essentially due to the relative position of the axes A and B with respect to the second pulley 5.

In particular, in the first embodiment (FIG. 2) the axis A is positioned within the area occupied by the second pulley 5, close to the periphery thereof, so that the axis B is close to the axis of the second pulley 5 and moves about the same; in the second embodiment (FIG. 3) the axis A coincides with the axis of the second pulley 5; in the third embodiment (FIG. 4), both the axis A and the axis B are positioned outside the area occupied by the second pulley 5.

These variations allow different assembly solutions on the vehicle and, in particular, adaptation of the tensioner to the layout of the drive and to the fixing points available on the electric machine 6 or close thereto.

Construction examples of the three embodiments briefly described above are given below. For the sake of brevity, the description of particular accessories is omitted, such as bushings, bearings or other axial or radial support elements, used in order to reduce the friction and/or wear between the parts in relative movement, or to produce controlled damping between parts in relative movement. Said details are illustrated, in particular in the exploded views, and their function will be evident to a person skilled in the art.

FIGS. 5 to 9 illustrate an embodiment example of the first solution (diagram of FIG. 2), indicated overall by 10A, which is described below by using the same reference numbers for the parts already described with reference to the preceding figures.

Figure 7:
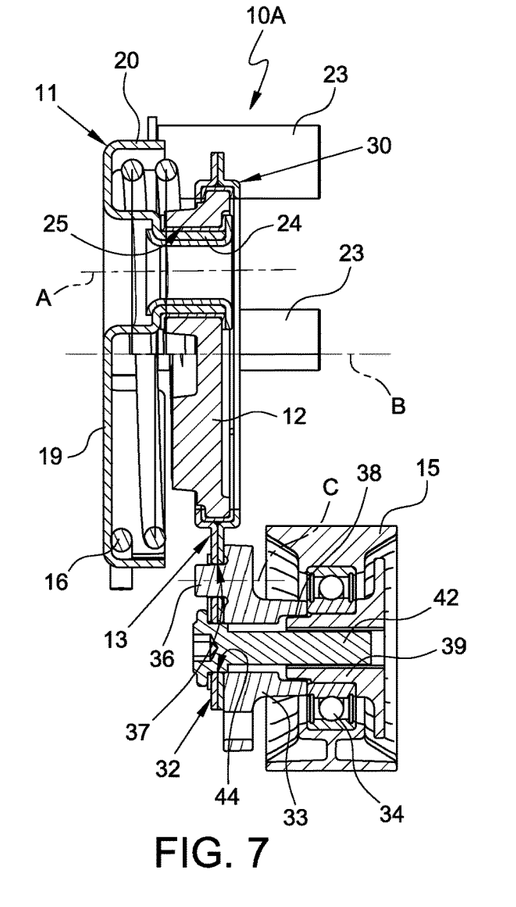
FIG. 7 is a section according to line VII-VII of FIG. 6.
Figure 8:
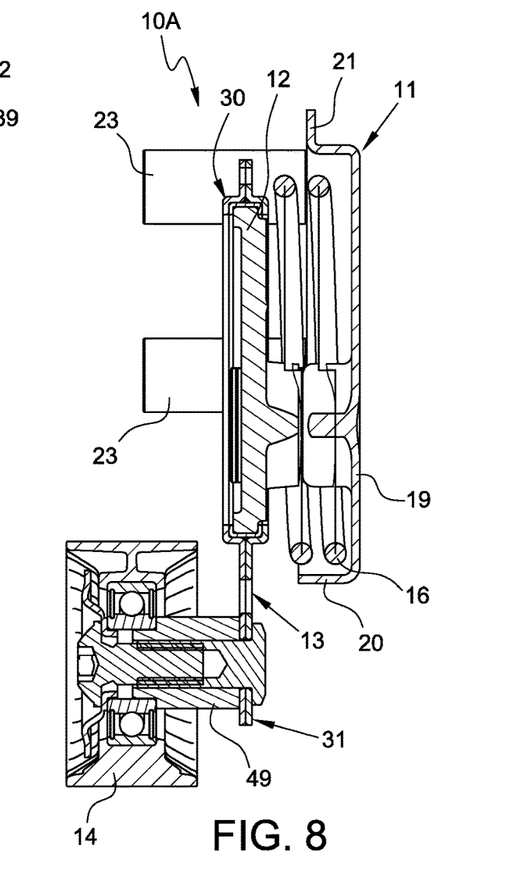
FIG. 8 is a section according to line VIII-VIII of FIG. 6.

The support element 11 of the tensioner 10A, expediently made of pressed sheet metal, is substantially disc-shaped with a flat bottom wall 19 and an outer perimeter edge 20 folded axially towards the electric machine 6 (FIGS. 7 and 8). The support element 11 is further provided with a flanged outer lateral appendage 21, provided with a plurality of fixing holes 22 adapted to allow the fixing on the casing (not illustrated) of the electric machine 6 by means of screws (not illustrated). Expediently, the screws are housed passing through respective tubular spacers 23 (FIGS. 7, 9 and 10) fixed to the flange 21, for example by means of welding or heading, and having the purpose of axially spacing the support element 11 from the casing of the electric machine 6. The support element 11 integrally comprises a pin 24 which axially extends from the bottom wall 19 in an eccentric position with respect to the edge 20 and defines the axis A.

The intermediate element 12 of the tensioner 10A is substantially disc-shaped having an axis B with an eccentric hole 25 rotatingly engaged by the pin 24.

The tensioner element 13 comprises an annular hub portion 30 rotating about the intermediate element 12 (and therefore the axis B) and a pair of arms 31, 32 extending radially in directions diverging from the hub portion 30.

Expediently, the tensioner element 13 consists of a pair of half-shells 13a, 13b (FIGS. 9, 10) made of pressed sheet metal, which are sandwich-assembled on opposite sides of the intermediate element 12 forming the hub portion 30 which encloses the intermediate element 12 and the arms 31, 32 on which the pulleys 14, 15 are rotatingly mounted. The two half-shells 13a, 13b are identical to each other for reasons of economy of scale.

One of the two tensioner pulleys (15) is preferably mounted in an adjustable manner on the respective arm 32, so as to allow variation of the centre distance between said pulleys to adjust the installation tension of the belt and to compensate for the manufacturing tolerances of the belt and drive layout.

For said purpose, the tensioner pulley 15 is mounted by means of a bearing 34 on a sleeve 39 which is telescopically coupled to an intermediate bushing 33 (FIG. 7) by means of a prismatic coupling 38, for example with hexagonal section; the bearing 34 is axially comprised between respective shoulders of the sleeve 39 and the intermediate bushing 33.

Figure 9:
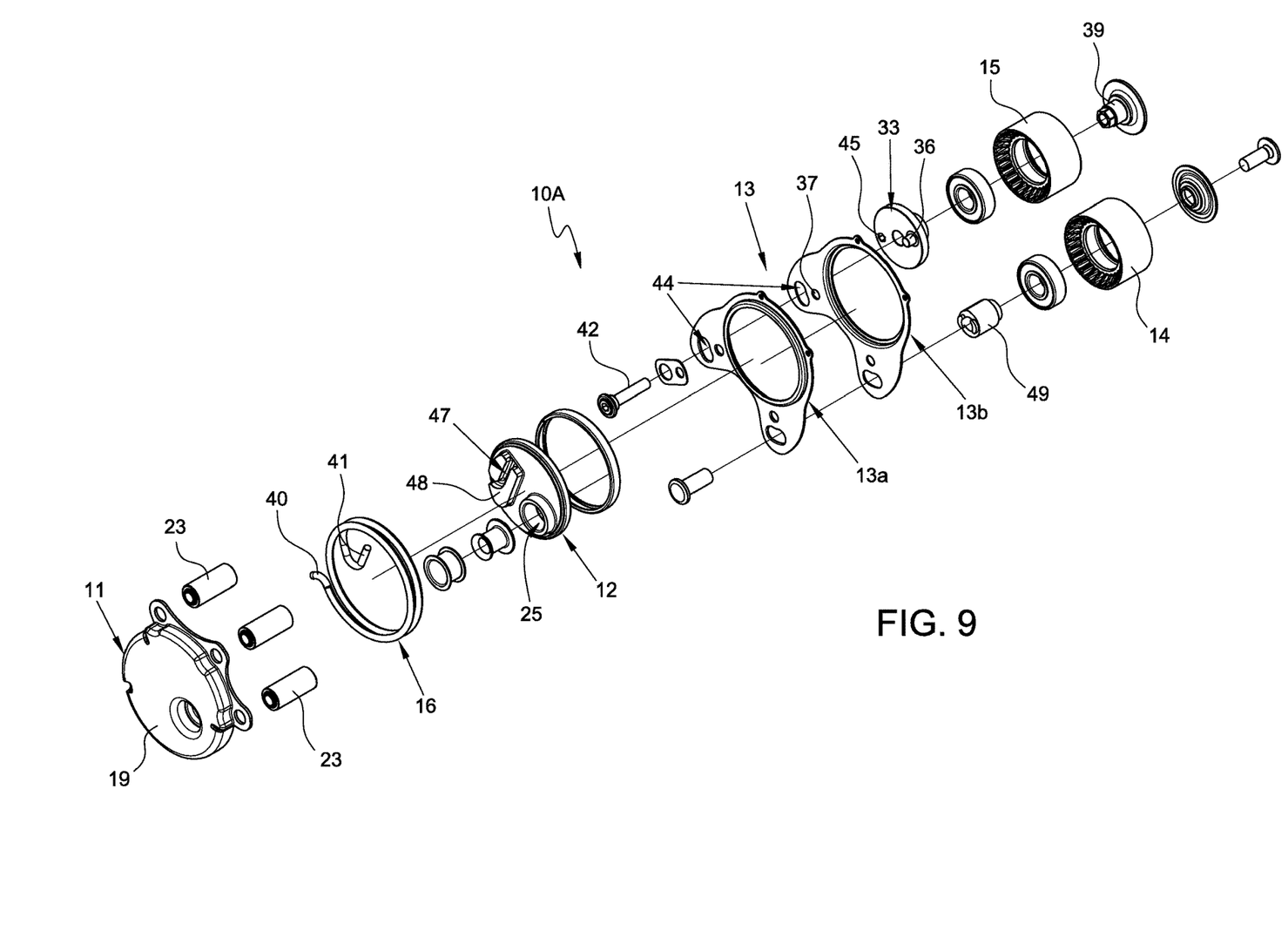
FIGS. 9 and 10 are exploded perspective views, from opposite sides, of the tensioner of FIGS. 5 and 6.
Figure 10:
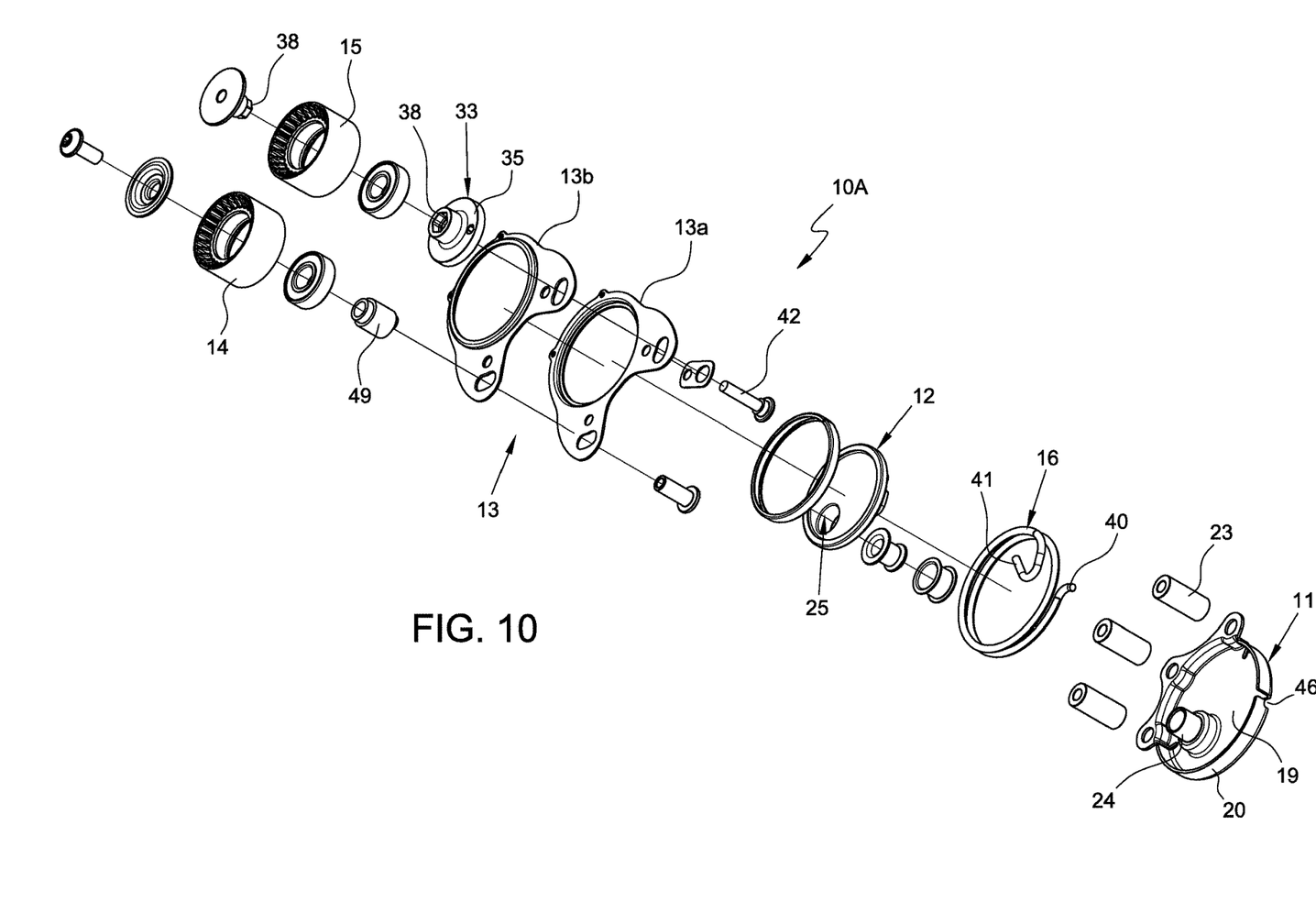
Figure 11:
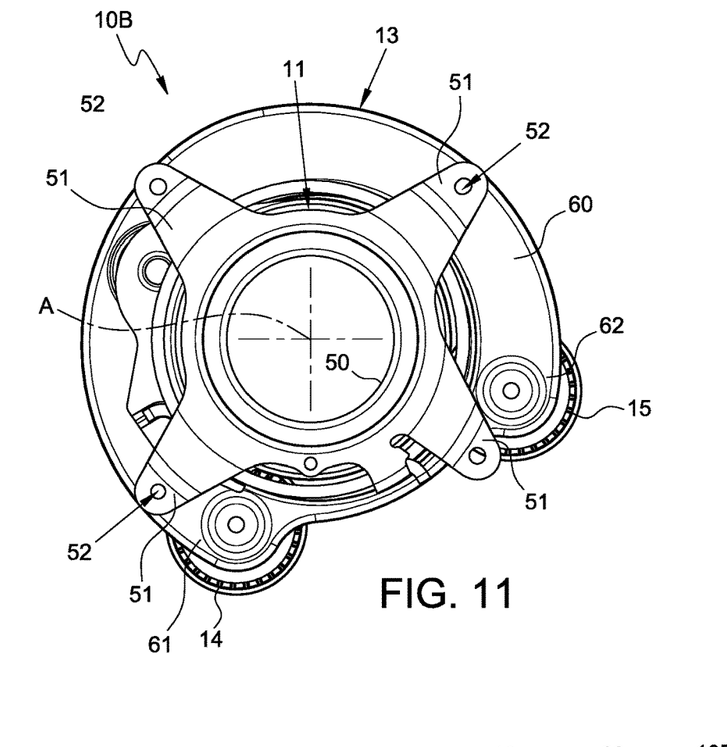
FIG. 11 is a front elevation view of the second embodiment of the tensioner according to the invention.
Figure 12:
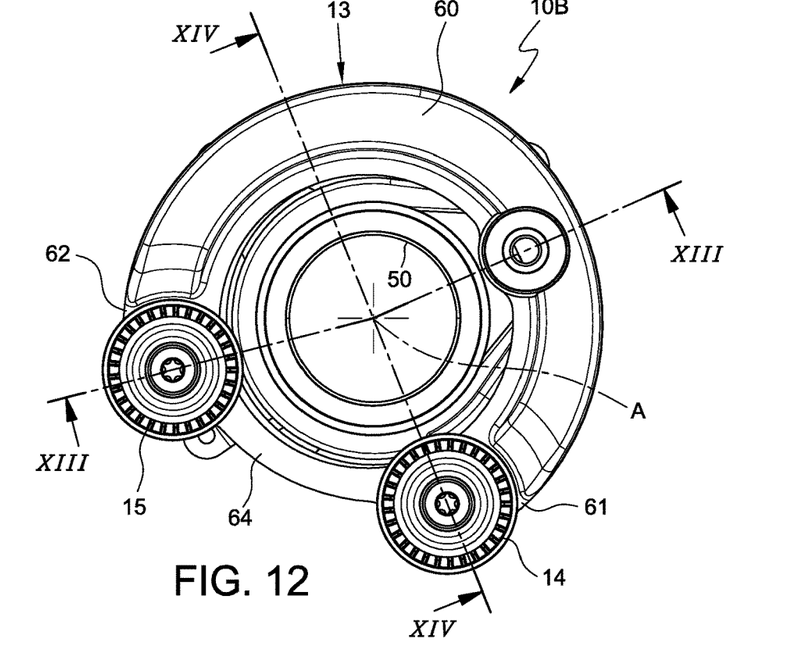
FIG. 12 is a rear elevation view of the tensioner of FIG. 11.

The intermediate bushing 33 comprises a discoidal end flange 35, on the opposite side of the bearing 34, from which an eccentric peg 36 axially extends (FIGS. 7 and 9). The peg 36 is housed in a hole 37 of the arm 32, defining a rotation axis C of the intermediate bushing 33 with respect to the arm 32.

The arm 32 further comprises an arcuate slot 44 having a centre of curvature on the axis C. A screw 42, arranged passing through the slot 44 (without transversal play) and through the intermediate bushing 33, is screwed in the sleeve 39.

The flange 35 of the intermediate bushing 33 is lastly provided with a prismatic, for example hexagonal, seat 45 for a wrench (not illustrated), arranged diametrically opposite to the peg 36 with respect to the axis of the intermediate bushing 33.

Since the two half-shells 13A, 13B are identical to each other, also the arm 31 has the hole 37 and the slot 44, although not necessary for the purposes of adjustment of the position of the tensioner pulley 14. Therefore, the tensioner pulley 14 is mounted on a support 49 engaging the slot 44 in a fixed manner.

The spring 16, acting between the support element 11 and the intermediate element 12 so as to exert on the latter a thrust maintaining the pulleys 14 and 15 against the belt 9, is a helical spring with a number of coils varying between 0.5 and 3, for example 2, housed in the support element 11 and provided with end curls 40, 41 cooperating respectively with a seat 46 on the edge 20 of the support element 11 and a seat 47 obtained in an axial protrusion 48 of the intermediate element 12.

Operation of the tensioner 10A, already partly evident from the preceding description, is as follows.

At installation, the screw 42 for blocking the intermediate bushing 33 is loosened, therefore the tensioner pulley 15 can be arranged in the most favourable position for installation of the belt 9. After the belt 9 has been installed on the pulleys 2, 5, 7, with the respective branches 9a, 9b arranged with their back in contact with the tensioner pulleys 14, 15, the tensioner pulley 15 can be moved, by means of a spanner in the seat 45 on the intermediate bushing 33, rotating it about the axis C, to a position such as to bring the belt 9 to the nominal tension under the thrust of the spring 16. The screw 42 is then tightened, fixing the intermediate bushing 33 to the tensioner element 13.

During operation, the tensioner element 13 is arranged in a position of equilibrium upon the rotation about the axis B under the action of the forces exchanged between the branches 9a, 9b of the belt 9 and the respective tensioner pulleys 14, 15. The tensioned branch of the belt 9 can be the branch 9a or the branch 9b according to the operating mode of the electric machine 6 (as generator driven by the IC engine 4 or as motor).

When the electric machine passes from one operating mode to the other, the tensioner element 13 rotates rigidly with respect to the intermediate element 12 about the axis B and is arranged in a new position of equilibrium, rotated with respect to the preceding position towards the new tensioned branch; also the intermediate element 12 finds a new position of equilibrium by rotating with respect to its axis A.

Since the tensioner element 13 is rigid and there is no elasticity interposed between the tensioner pulleys 14 and 15, the tensioner 10 is very reactive and promptly compensates for the instantaneous tension variations of the belt.

The length variations of the belt 9 during the working life thereof are compensated by rotation of the intermediate element 12 with respect to the support element 11 about the axis A (in an anticlockwise direction with reference to FIGS. 2 and 5) under the action of the spring 16.

FIGS. 11 to 16 illustrate a construction solution of the second embodiment of the invention according to the diagram of FIG. 3, indicated overall by 10B.

The support element 11 of the tensioner 10B, expediently made of pressed sheet metal, integrally comprises a tubular sleeve 50 having an axis A and a plurality of appendages 51 (FIG. 11, 15, 16) extending radially from one axial end of the sleeve 50 and provided with fixing holes 52 for fixing to the electric machine 6 by means of screws not illustrated.

Figure 13:
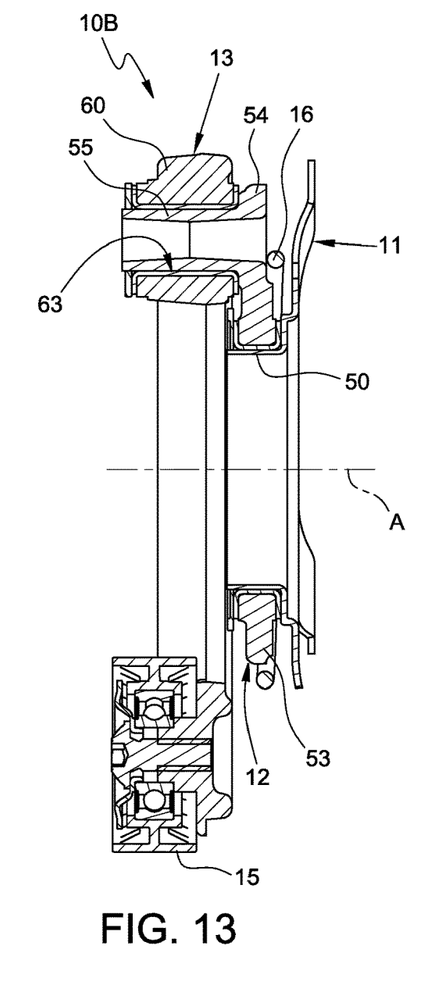
FIG. 13 is a section according to line XIII-XIII of FIG. 11.
Figure 14:
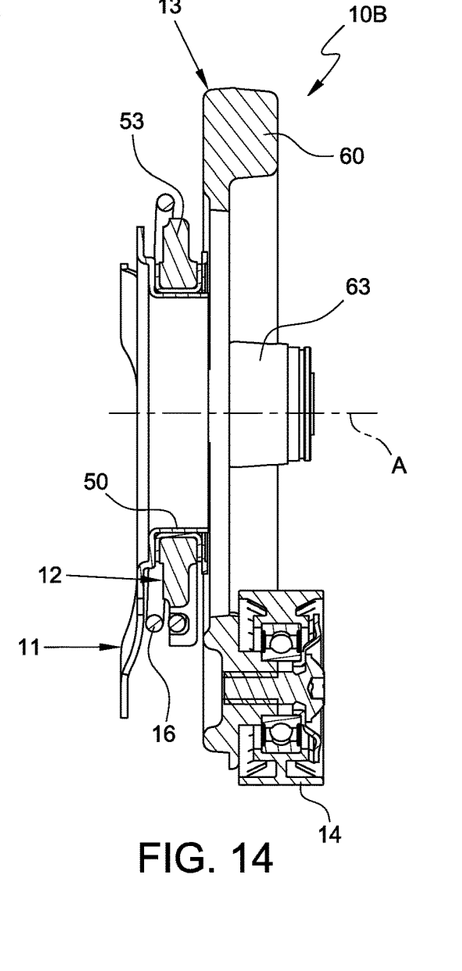
FIG. 14 is a section according to line XIV-XIV of FIG. 11.
Figure 15:
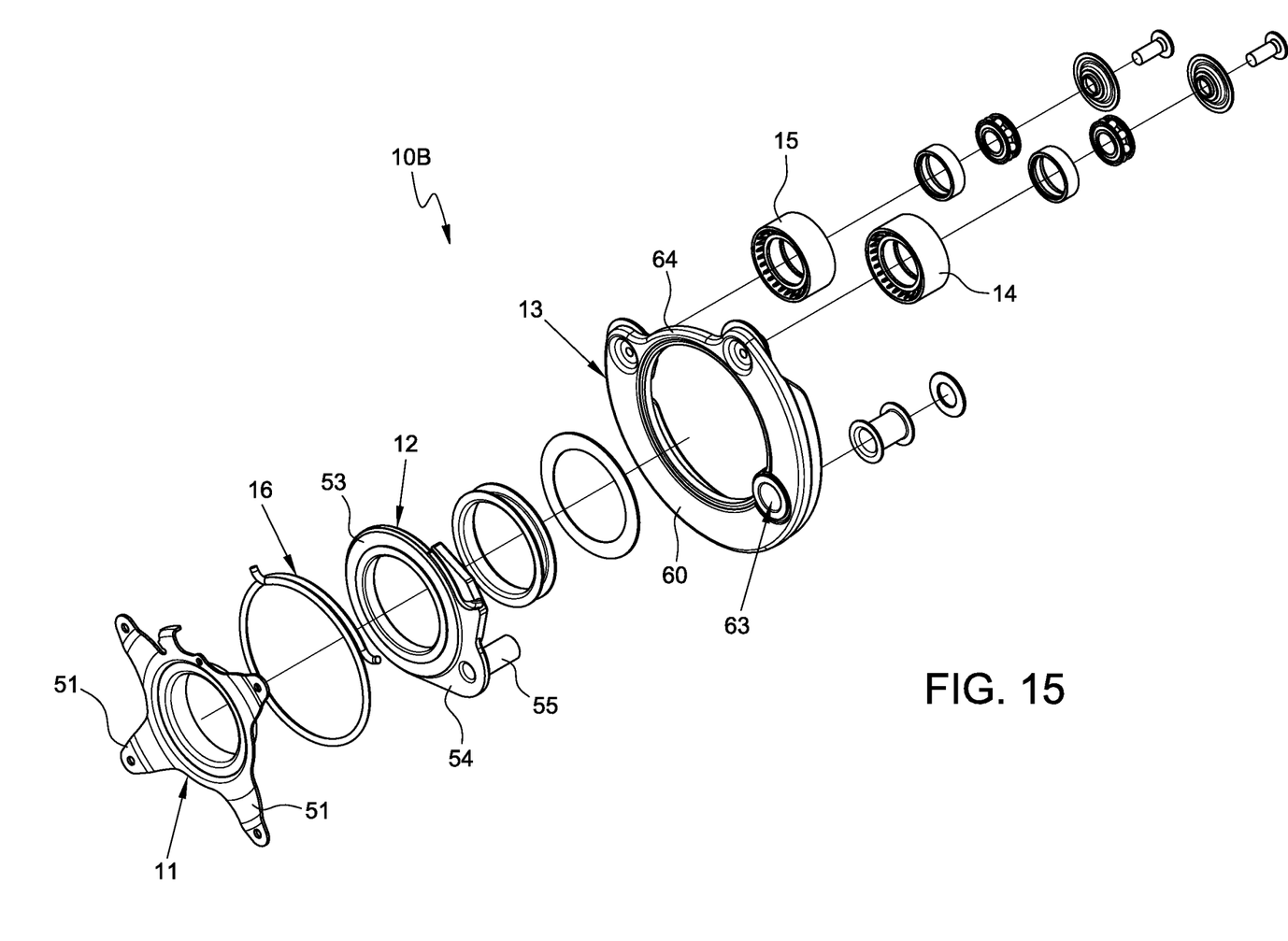
FIGS. 15 and 16 are exploded perspective views, from opposite sides, of the tensioner of FIGS. 11 and 12.
Figure 16:
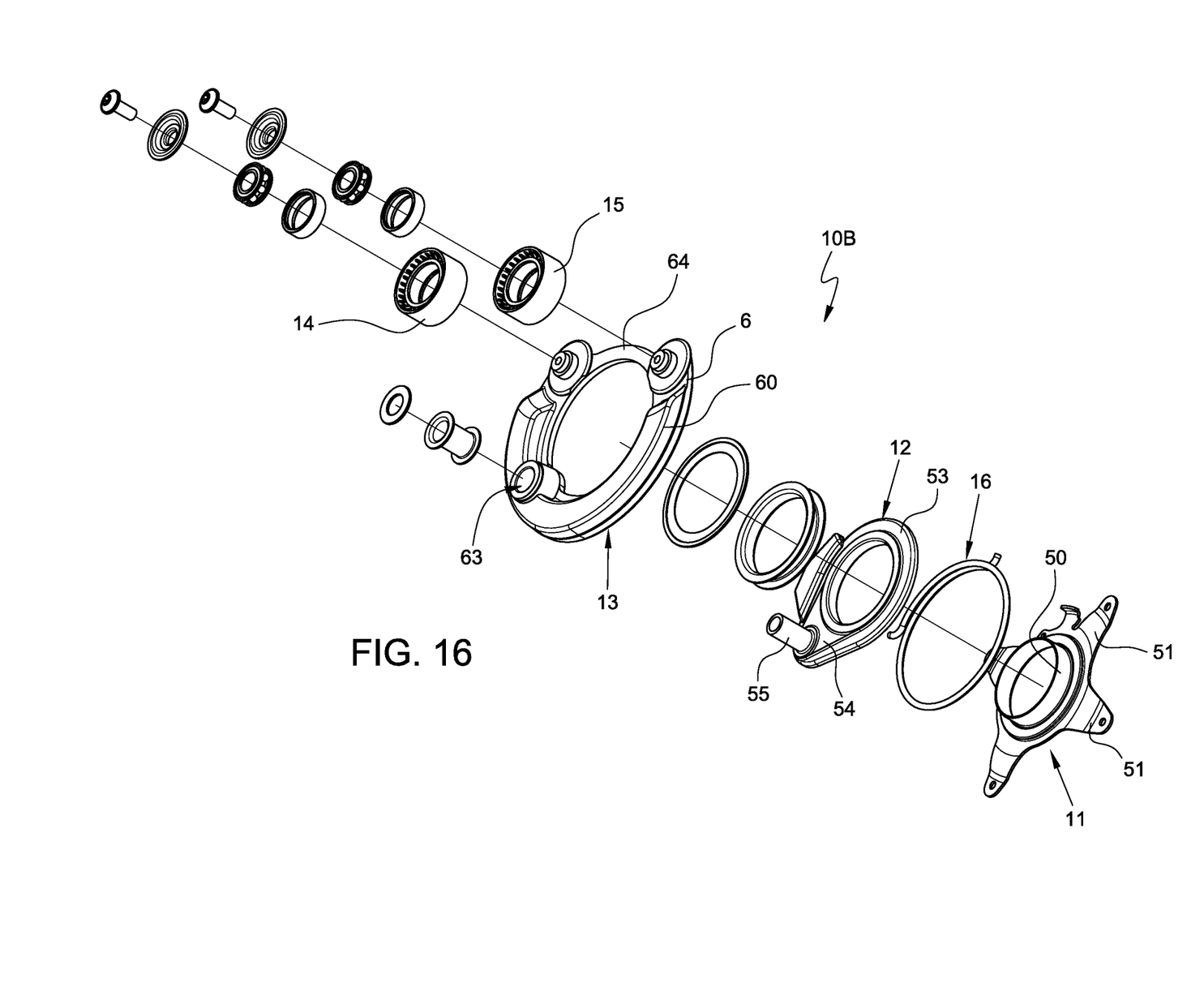
Figure 17:
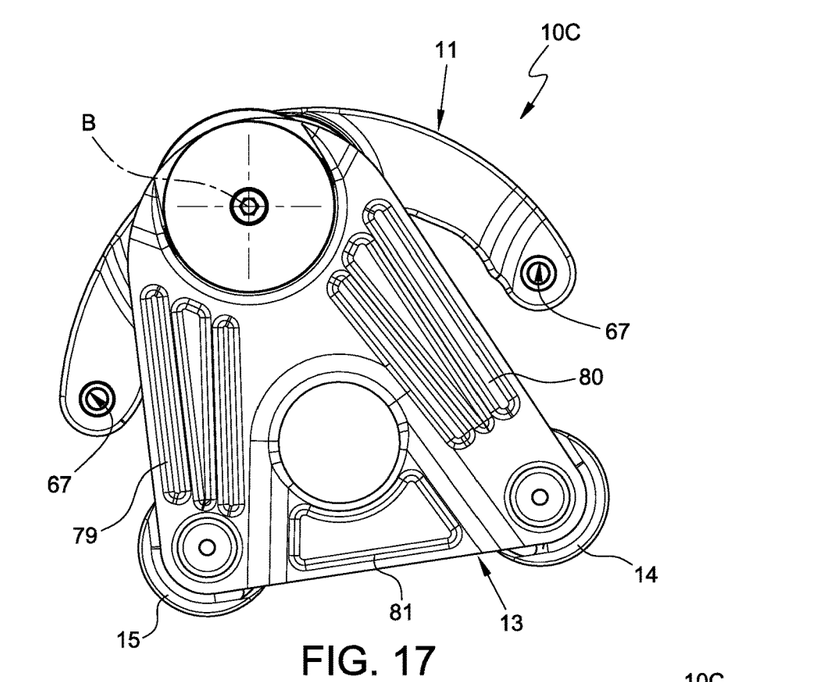
FIG. 17 is a front elevation view of a tensioner according to the third embodiment of the invention.
Figure 18:
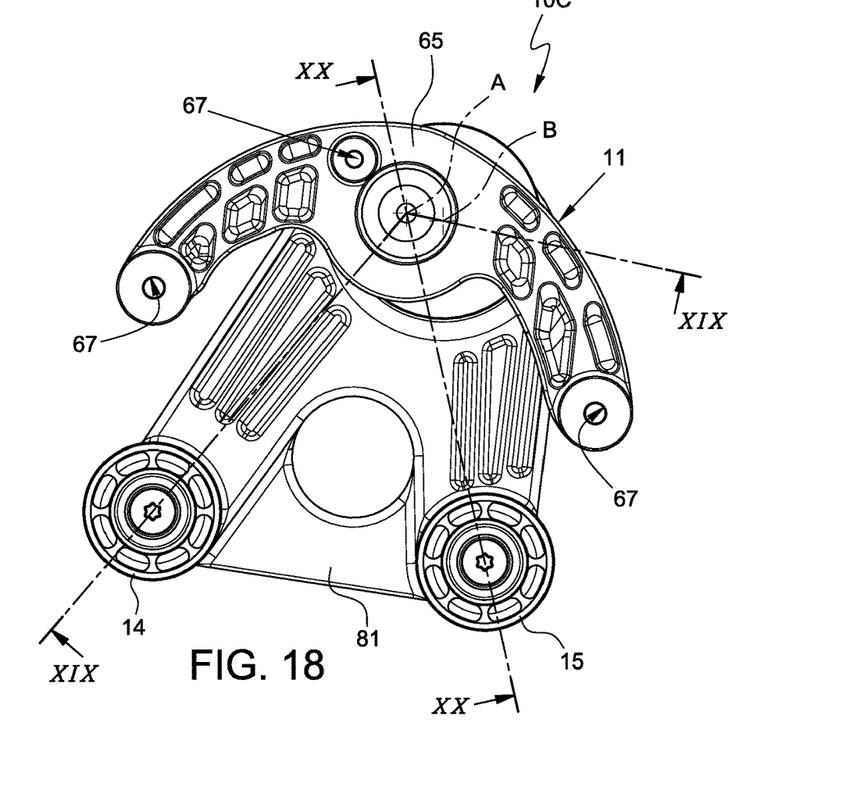
FIG. 18 is a rear elevation view of the tensioner of FIG. 18.
Figure 19:
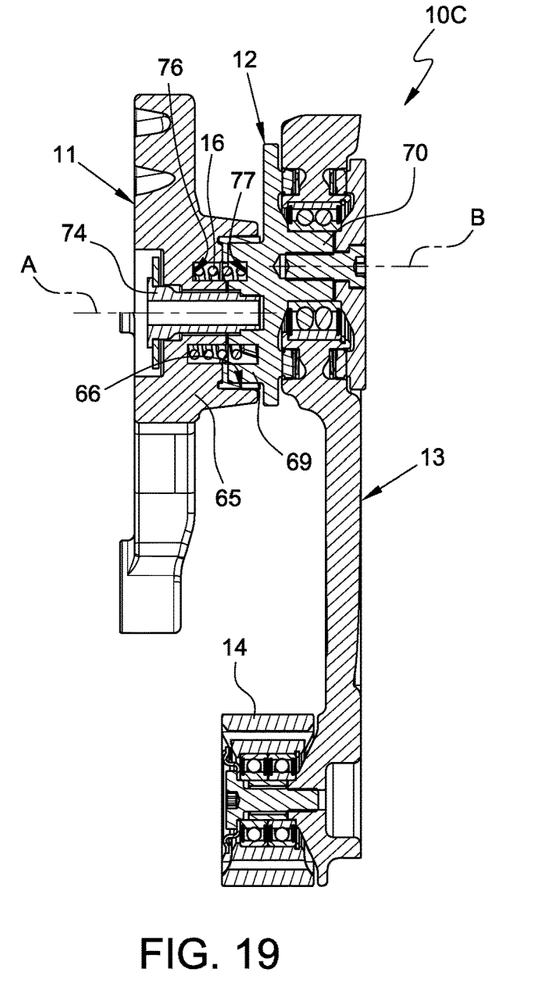
FIG. 19 is a section according to line XIX-XIX of FIG. 18.
Figure 20:
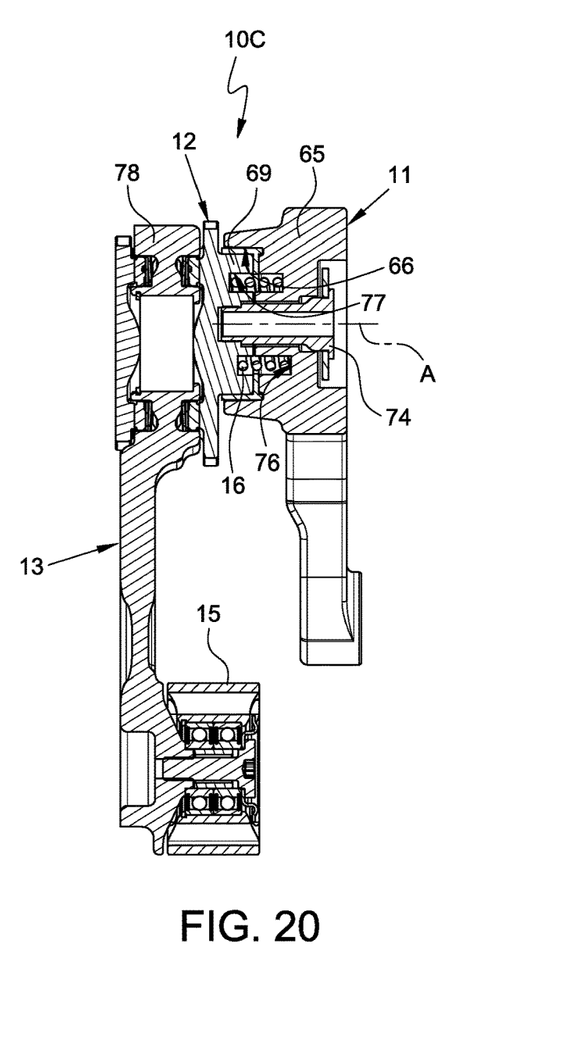
FIG. 20 is a section according to line XX-XX of FIG. 18.
Figure 21:
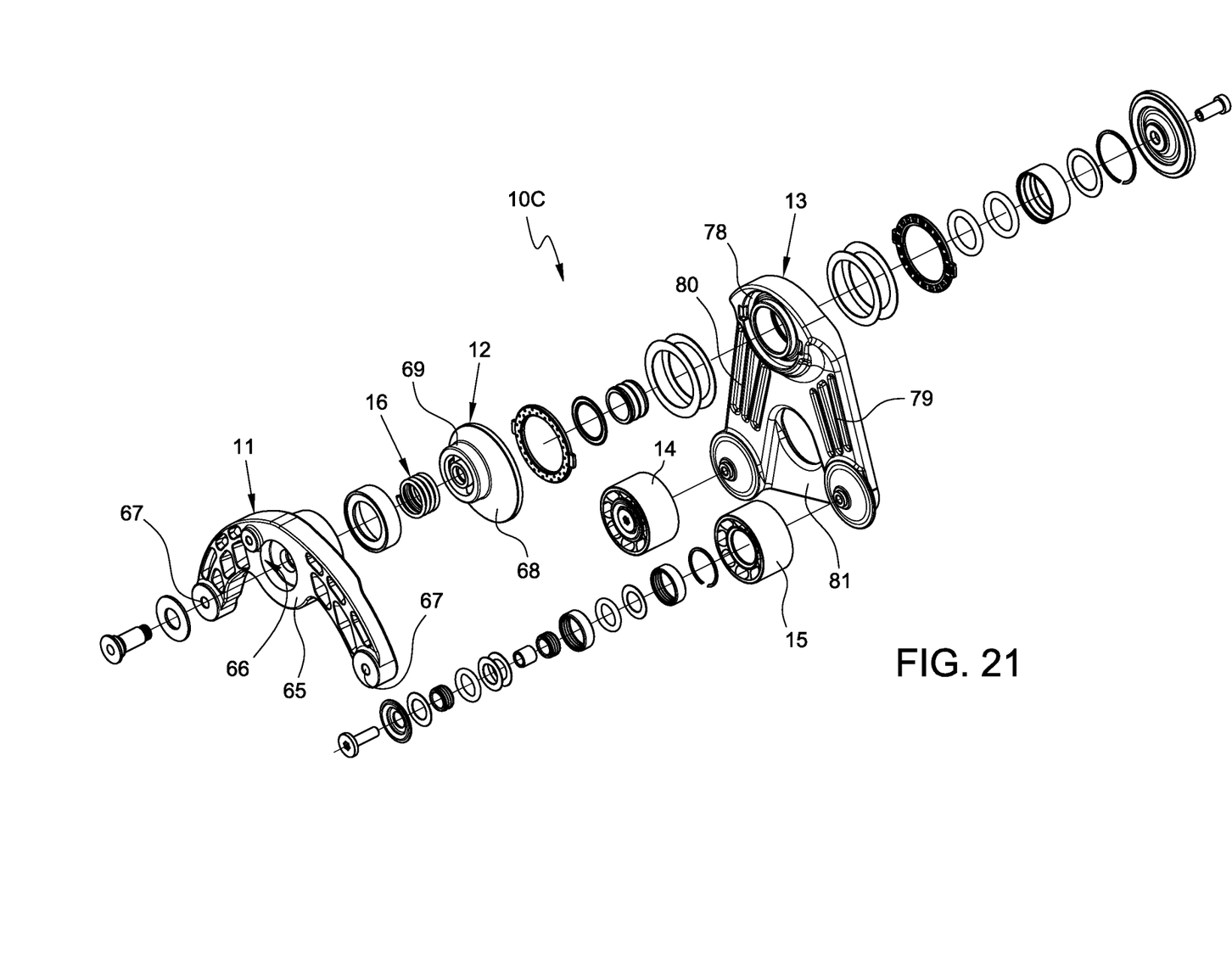
FIGS. 21 and 22 are exploded perspective views, from opposite sides, of the tensioner of FIGS. 17 and 18.
Figure 22:
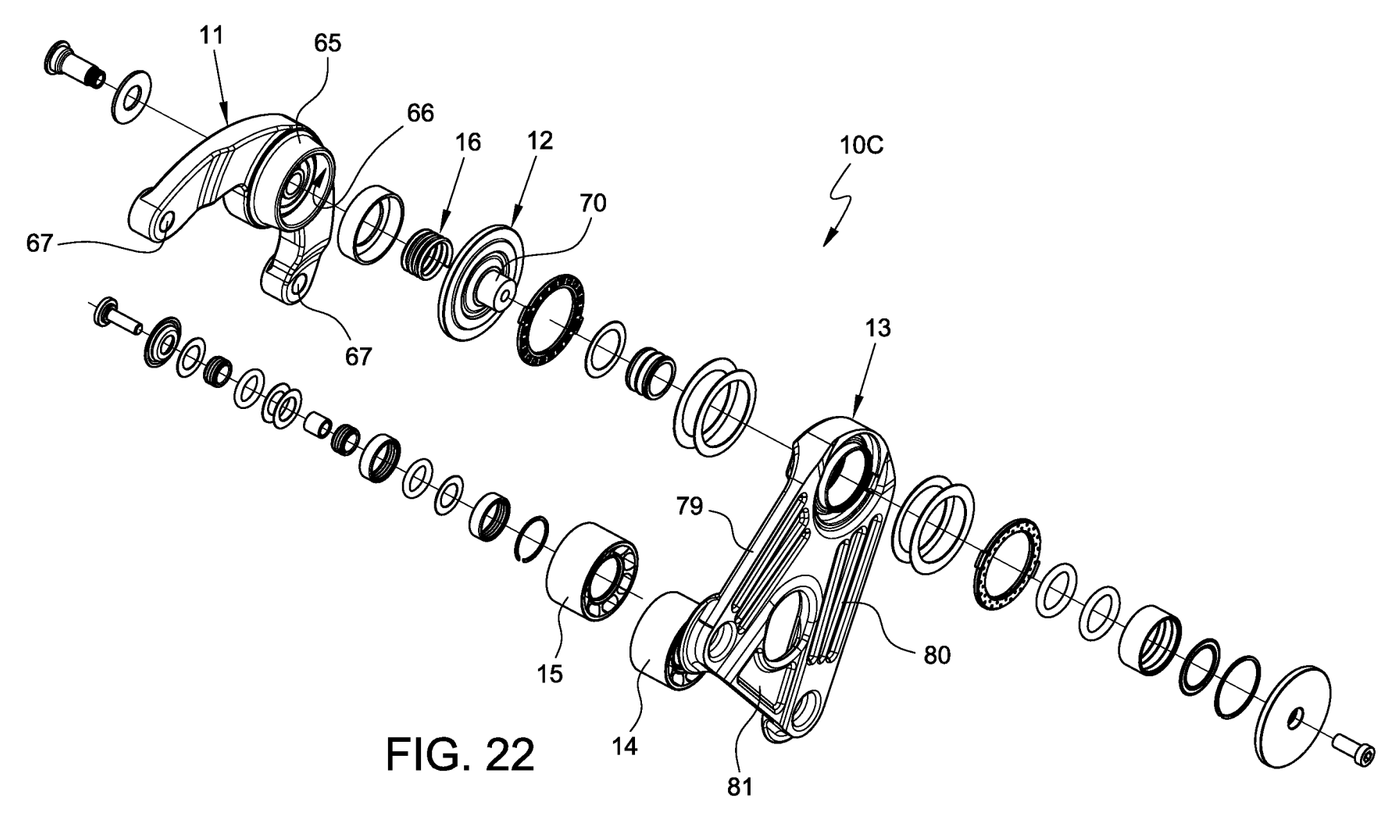

The intermediate element 12 of the tensioner 10B comprises an annular hub portion 53, which is mounted rotatingly on the sleeve 50, and an arm portion 54 radially extending from the hub portion 53 and bearing an axial pin 55 having an axis B (FIGS. 13, 15, 16).

The spring 16 acts between the support element 11 and the intermediate element 12, analogously to what is described for the tensioner 10A.

The tensioner element 13 has a substantially annular shape, with a main portion 60 substantially C-shaped and extending for approximately three quarters of the circumferential development of the tensioner element 13. The tensioner pulleys 14, 15 are mounted rotatingly on the respective ends 61, 62 of the main portion 60.

In the example illustrated the pulleys 14, 15 are mounted on the tensioner element 13 in a fixed manner; alternatively, one of the tensioner pulleys 14, 15 can be mounted in an adjustable manner as described for the tensioner 10A.

The main portion 60 has a seat 63 arranged in an intermediate position between the tensioner pulleys 14, 17, which is rotatingly engaged by the pin 55, thus defining an articulated connection having an axis B between the intermediate element 12 and the tensioner element 13.

Lastly the tensioner element 13 comprises a stiffening portion 64, less thick than the main portion 60, which integrally connects the ends 61, 62 of the main portion 60.

Operation of the tensioner 10B is substantially analogous to that of the tensioner 10A described.

FIGS. 17 to 22 illustrate a construction solution of the third embodiment of the invention according to the diagram of FIG. 4, indicated overall by 10C.

The support element 11 of the tensioner 10C is substantially C-shaped and comprises an intermediate circular bulge 65, defining a frontal cylindrical cavity 66 having an axis A (FIGS. 19, 20), and a plurality of holes 67 (FIGS. 17, 18) for fixing to the electric machine 6.

The intermediate element 12 comprises a disc 68, from opposite faces of which a first eccentric pin 69 having an axis A and a second pin 70 coaxial with the disc 68, having an axis B, extend axially in opposite directions.

The pin 69 is rotatingly coupled to the cavity 66; an axial screw 74, passing through the support element 11, axially blocks the intermediate element 12 on the latter.

The spring 16 is in this case a cylindrical helical spring housed partially in respective annular frontal seats 76, 77 obtained on the bottom of the cavity 66 and in the pin 69.

The tensioner element 13 comprises an annular hub portion 78 rotating about the second pin 70 of the intermediate element 12 (and therefore about the axis B) and a pair of arms 79, 80 radially extending in directions diverging from the hub portion 78. The arms 79, 78 are expediently integrally connected to each other by a stiffening portion 81.

The tensioner pulleys 14, 15 are mounted rotatingly on the ends of the arms 79, 80. Although not illustrated, one of the tensioner pulleys 14, 15 can be mounted in an adjustable manner on the respective arm 79, 80 as described for the tensioner 10A.

Operation of the tensioner 10C is conceptually analogous to that of the tensioners 10A and 10B.

From an examination of the characteristics of the tensioners described, the advantages of the present invention are evident.

The use, in combination, of an intermediate support element 12 rotating about a first axis A under the action of a spring 16 and a rigid tensioner element 13 rotating with respect to the intermediate element 12 about a second axis B and bearing both the tensioner pulleys that allows a high reactivity to the sudden variations in tension of the belt to be obtained and, at the same time, recovery of the belt elongations.

Lastly it is clear that modifications and variations that do not depart from the protective scope defined by the claims can be made to the tensioners described.

The invention claimed is:

1. A tensioner for an accessory drive of a motor vehicle provided with an internal combustion engine and a reversible electric machine acting as motor and generator, the drive comprising at least a first pulley mounted on a drive shaft of the internal combustion engine, a second pulley mounted on the shaft of the electric machine and an endless drive element cooperating with at least said first pulley and said second pulley, the tensioner comprising:

a support element fixedly mountable on or close to the electric machine;

an intermediate element carried by the support element and rotating with respect thereto about a first fixed axis;

a rigid tensioner element rotating with respect to the intermediate element about a second axis parallel to the first axis and distinct therefrom;

a first tensioning pulley and a second tensioning pulley carried by the tensioner element and rotating with respect thereto about respective axes distinct from said first axis and second axis and arranged in use in a fixed relative position; and at least one spring acting between the support element and the intermediate element to push the first and second tensioning pulleys into contact with respective branches of the endless drive element positioned on opposite sides with respect to the second pulley.

2. The tensioner according to claim 1, wherein characterized in that the support element comprises an annular sleeve or a pin defining the first axis.

3. The tensioner according to claim 1, wherein the support element comprises a plurality of fixing holes for the connection to a casing of the electric machine.

4. The tensioner according to claim 1, wherein the intermediate element comprises a hub portion rotatably mounted on the support element about the first axis and an aim portion extending radially from the hub portion and defining the second axis.

5. The tensioner according to claim 4, wherein the hub portion is housed in a rotating manner about the sleeve or pin of the support element.

6. The tensioner according to claim 1, wherein the intermediate element comprises a first pin defining the second axis and the tensioner element comprises a seat rotatably coupled to said first pin.

7. The tensioner according to claim 6, wherein said intermediate element comprises a second pin for rotatably coupling with the support element, said first and second pins extending on axially opposite sides.

8. The tensioner according to claim 1, wherein said intermediate element is disc-shaped.

9. The tensioner according to claim 1, wherein the tensioner element has a closed annular shape.

10. The tensioner according to claim 1, wherein the tensioner element comprises a hub portion constrained to said intermediate element and two arms extending radially from the hub portion and bearing the respective first and second tensioning pulleys.

11. The tensioner according to claim 10, comprising a stiffening portion connecting the two arms to each other.

12. The tensioner according to claim 1, wherein the second tensioning pulley is mounted in an adjustable manner on the tensioner element to vary the installation tension of the endless drive element.

13. The tensioner according to claim 12, wherein the tensioner element comprises an intermediate support element for said second tensioning pulley rotatably mounted about a third axis with respect to the tensioner element and a blocking element for blocking the intermediate support element on the tensioner element in a selectable position to obtain a predetermined tension value of the endless drive element.

14. The tensioner according to claim 13, wherein the blocking element slidingly engages a first elongated slot of the tensioner element extending along a circumference centered about said third axis.

15. The tensioner according to claim 13 or 14, wherein said tensioner element is formed by two half shells, identical to and superimposed on each other, and said first tensioning pulley is carried by a support engaging a second elongated slot on said tensioner element in a fixed manner.

* * * * *

UNITED STATES PATENT AND TRADEMARK OFFICE
CERTIFICATE OF CORRECTION

PATENT NO. : 11,242,917 B2
APPLICATION NO. : 16/614013
DATED : February 8, 2022
INVENTOR(S) : Montani et al.

Page 1 of 1

It is certified that error appears in the above-identified patent and that said Letters Patent is hereby corrected as shown below:

In the Claims

Column 7, Lines 18-19, "characterized in that" should be deleted.

Column 7, Line 26, "aim" should read --arm--.

Column 8, Line 30, "13 or" should be deleted.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*